United States Patent Office 3,542,907
Patented Nov. 24, 1970

3,542,907
METHOD OF TEMPORARILY DEFORMING HYDROPHILIC CONTACT LENSES, GRINDING AND POLISHING
Otto Wichterle, Prague, Czechoslovakia, assignor to Ceskoslovenska akademie ved, Prague, Czechoslovakia
No Drawing. Filed Feb. 15, 1967, Ser. No. 616,208
Claims priority, application Czechoslovakia, Feb. 22, 1966, 1,170/66
The portion of the term of the patent subsequent to Feb. 24, 1987, has been disclaimed
Int. Cl. B25d *11/00;* B29c *17/12*
U.S. Cl. 264—1                                   2 Claims

ABSTRACT OF THE DISCLOSURE

A lens or lens blank prepared by copolymerization of ethyleneglycol monomethacrylate with a small amount of the corresponding dimethacrylate in a rotating spherical mold is heated above the softening temperature, and its concave refractive surface is pressed against a similarly heated flat, spherical, or cylindrical object to deform the lens or blank. The lens or blank is cooled under the deforming pressure below the softening point to fix the deformed shape, finished by grinding or polishing, and swelled in physiological saline solution to reverse the initial deformation under heat and pressure.

---

This invention relates to contact lenses of sparingly cross-linked hydrophilic polymers, and particularly to a method of finishing refractive surfaces on such lenses.

When water-swollen hydrophilic lenses cannot be further machined or otherwise shaped by means of known processes. The lenses heretofore could only be shaped by casting the monomers into moulds (French Pat. No. 1,342,447), or by machining the hydrophilic gels in the dry state (French Pat. No. 1,422,109). Lenses made by the first method which have the slightest defect of shape (irregular edges, particles of dust on the lens surface, irregularities formed by so-called pop-corn polymerization etc.) were thus useless, since up to now no method was known, by means of which these defects could be removed. When a swollen gel is dried, deformations always occur so that the dry lens has a shape somewhat different from that which it had on casting, or which it had in the swollen fully relaxed state. Least deformation occurs in drying at a rather high temperature (e.g. 100° C.), at which concentration differences within the lens are equallised more rapidly, if drying is retarded by controlled steam removal. However, even under these most favourable conditions, the dried lens is a perfect replica of the swollen lens since even the slightest deviations from homogeneity in the gel material cause comparatively great deformations, especially at the edges of the dried lens. If a perfect replica of the original shape could be attained, it would not be suitable for polishing, since the inner refractive surface of a lens prepared by rotary casting is a concave paraboloid or hyperboloid, and the external refractive surfaces are not simply spherical.

According to the invention herein described, the thermoelasticity and shape-memory of the dry gel material is utilised in order to give one of the lens or lens blank surfaces such a regular and simple shape at a temperature in the elastic range above the softening point of the gel, as is best suited to the mechanical treatment of this surface, whereupon the lens is allowed to cool below the glass transition point, or down to room temperature. The lens retains in this state, and at this low temperature, its newly acquired shape, and may be subjected to machining, grinding or polishing. After this finishing of one of the lens surfaces the lens may again be heated to the elastic state, in order to allow the other surface to be shaped. Thereafter, the lens may be either stored in the deformed state, or it may be relaxed to the initial shape by heating. Return to the initial state may, of course, also be achieved simply by letting the lens swell in water or in suitable other solvents. It is evident that it is simplest to bring the lens back to equilibrium directly by absorption of physiological salt solution so that it is prepared for application to the cornea.

Planar or spherical surfaces are best suited for mechanical treatment. With spherical surfaces, which correspond in their radius to the radius of the average cornea multiplied by the coefficient of linear swelling of the gel in water, it is easily possible to measure the central thickness, weight or volume and optical strength of the lens. The linear parameters are converted to parameters of the swollen lens by multiplication by the swelling coefficient. The optical strength is calculated by dividing the dioptric value obtained for the dry lens by the refractive index of the dry gel decreased by one, multiplying the quotient by the refractive index of the swollen gel decreased by one, and dividing the result by the swelling coefficient.

It is apparent that the surfaces best suited for mechanical finishing are either a plane or a sperical surface. Other surfaces, however, may also be shaped to achieve modifications of the optical and other properties of the lenses. Thus, the inner or outer refractive surfaces of the lens may be made cylindrical, then ground and polished to a plane. After relaxation, the cylindrical component of refraction is retained in the lens which may be used as a corrective lens for an astigmatic eye. If the lens is pressed on a planar surface, in which grooves are etched or engraved, the material of the lens is pressed into these grooves. When the resulting ridges on the lens are ground down to a plane, grooves are formed in the lens after relaxation of the lens by swelling or heating. This technique may be used in order to form a system of channels on the inner refractive surface which facilitate the exchange of liquid below the lens and improve the nutrition of the cornea.

EXAMPLE 1

A contact lens, prepared by rotating a monomer mixture composed of 99.5% glycolmonomethacrylate, 0.4% glycoldimethacrylate and 0.1% isopropylpercarbonate in a spherical mould 6 mm. in radius at 470 revs./min. was washed in distilled water and dried in a drying oven at 105° C. Then a rubber stopper, preheated to 150° C. was used to press the lens onto a ground glass plate equally preheated, the surface of the plate having been coated with pure paraffin oil. The lens was softened by the heat within 10 seconds, flattened by the pressure on the plate and was fastened to the ground surface by a "suction-cup" effect. After cooling of the glass, the lens was easily removed. Its planar surface which replaced an original, somewhat irregular concave surface was then polished on a flat grinding plate covered with fine woolen fabric impregnated with a suspension of finely ground ceric oxide in xylene. The polished lens was permitted to swell in physiological saline solution.

EXAMPLE 2

A lens prepared as in Example 1 was pressed after drying, against the polished surface of a steel ball having a radius of 6.35 mm. and a temperature of 155° C. Adhesion was achieved either by means of a foil of silicone rubber drawn over an annular drum, or by means of fine elastic knitted fabric or crimped polyester fiber. While being pressed against the ball, the lens was cooled, its inner surface was polished on a spherical polishing plate 6.35 mm. in radius, and the lens was then measured on a focometer, as used conventionally to measure hard contact lenses. A value of −7.25 D. was found. Since the refractive index of the dry gel is 1.52, that of the swollen gel 1.42 and the swelling coefficient is 1.17, the value of this lens calculated for a cornea curvature of 6.35×1.17=7.5 mm. is $$\frac{-7.25 \cdot 0.42}{1.17 \cdot 0.52} = -5.0 \text{ D}$$

I claim:
1. A method of finishing a contact lens or lens blank essentially consisting of a sparingly cross-linked hydrophilic polymer, which comprises:
 (a) heating the lens or lens blank while in the dry non-swollen condition to a temperature in the elastic range above the softening point of said polymer, the lens or lens blank having two opposite refractive faces;
 (b) holding one of said faces in contact with a flat, cylindrical, or spherical surface of a body having said temperature, the surface having a shape different from the initial shape of said one face, and said one face being held in contact with said surface under pressure until said one face substantially conforms to said surface;
 (c) cooling said lens or lens blank and said surface to a temperature lower than said softening point while maintaining said contact;
 (d) separating said lens or lens blank from said surface to expose the conformingly deformed face thereof;
 (e) polishing the exposed, conformingly deformed face without changing the shape thereof;
 (f) heating said body with a swelling liquid to a temperature in the elastic range higher than said softening point;
 (g) holding the other one of said faces in contact with a flat, cylindrical, or spherical surface of a body having said higher temperature, the shape of the last mentioned surface being different from the initial shape of said other face, and said other face being held in contact with said last-mentioned surface under pressure until said other face substantially conforms to said last-mentioned surface;
 (h) cooling said lens and said last-mentioned surface to a temperature lower than said softening point while maintaining said contact thereof;
 (i) separating said lens or lens blank from the last-mentioned body to expose the conformingly deformed other face thereof;
 (j) polishing said exposed, conformingly deformed other face without changing the shape thereof; and
 (k) thereafter holding said lens or lens blank in contact with a swelling liquid until said liquid is absorbed in said lens or lens blank and said polished lens face resumes its initial shape.
2. A method as set forth in claim 1, wherein said polymer is a copolymer of ethyleneglycol monomethacrylate with a minor amount of ethyleneglycol dimethacrylate.

References Cited

UNITED STATES PATENTS

| | | | |
|---|---|---|---|
| 2,302,918 | 11/1942 | Smith | 264—1 |
| 2,342,378 | 2/1944 | Smith | 264—1 |
| 2,664,025 | 12/1953 | Herman | 264—1 |
| 3,064,401 | 11/1962 | Mooney | 264—1 |
| 3,124,623 | 3/1964 | Slawson | 264—1 |
| 3,221,083 | 11/1965 | Crandon | 264—1 |
| 3,248,460 | 4/1966 | Nawokas | 264—1 |
| 3,263,005 | 7/1966 | Emerick | 264—1 |
| 3,297,422 | 1/1967 | Emerson et al. | 264—1 |
| 3,361,858 | 1/1968 | Wichterle | 264—1 |

JULIUS FROME, Primary Examiner

A. H. KOECKERT, Assistant Examiner

U.S. Cl. X.R.

264—162, 230, 343